United States Patent [19]

Weiland et al.

[11] 4,024,881
[45] May 24, 1977

[54] APPARATUS FOR REMOVING GELATINOUS SLUDGE AND SOLIDS FROM SETTLING BASINS

[75] Inventors: Henry J. Weiland, Birmingham; Dewey W. Black, Tarrant City, both of Ala.

[73] Assignee: Environment Improvement Systems, Inc., Birmingham, Ala.

[22] Filed: Jan. 22, 1976

[21] Appl. No.: 651,520

[52] U.S. Cl. .......................... 134/104; 134/167 R; 210/523
[51] Int. Cl.² .......................................... B08B 3/02
[58] Field of Search ............ 134/22 R, 24, 34, 104, 134/166 R, 167 R, 168 R, 169 R; 137/15, 238; 210/523, 525, 220, 221 R, 195 S, 256

[56] References Cited

UNITED STATES PATENTS

| | | | |
|---|---|---|---|
| 2,267,608 | 12/1941 | Hawley | 210/523 X |
| 2,695,710 | 11/1954 | Gibbs | 210/523 X |
| 3,245,420 | 4/1966 | Cherney | 134/167 R X |
| 3,449,772 | 6/1969 | Werner | 134/167 RX |
| 3,741,235 | 6/1973 | Ambrose et al. | 137/238 |

Primary Examiner—S. Leon Bashore
Assistant Examiner—Marc L. Caroff
Attorney, Agent, or Firm—Woodford R. Thompson, Jr.

[57] ABSTRACT

Gelatinous and other sludge agglomerations resulting from the clarifications of raw water or waste water is removed from the bottom of settling receptacles, such as basins, ponds, lagoons and clarifiers where velocity is reduced to facilitate separation. The settled gelatinous sludge and other solids are removed from the receptacle by introducing streams of liquid into contact with the sludge so as to produce laminar flow toward a withdrawal point or points without disturbing the supernatant water or other fluid.

3 Claims, 7 Drawing Figures

APPARATUS FOR REMOVING GELATINOUS SLUDGE AND SOLIDS FROM SETTLING BASINS

BACKGROUND OF THE INVENTION

This invention relates to apparatus for removing gelatinous sludge and solid sedimentations from settling basins, lagoons, ponds, pools, and the like.

In clarifying raw water from natural sources, such as lakes, rivers, wells and the like, to yield potable water, it is the usual practice to add to the raw water coagulants, such as alum with or without an alkali, such as lime and/or a synthetic coagulant, such as poly acrylamides. As is well known in the art to which our invention relates, these additives provide nuclei which attract the fine suspended solids of coloidial size or larger so as to form macroscopic agglomerations, which, with quiescence, tend to settle from the water. Also in clarifying industrial or other water for recirculation or for stream or sewer disposal it is common practice to facilitate solids separation from the liquid media by providing a zone or zones of quiescence. The sludges so formed and so deposited in the lower levels of the receptacle tend to gel, coalesce, thicken or cement themselves to each other and thus resist withdrawal through bottom outlet means which may communicate with suitable suction means, such as a pump. Dredging is an effective means for removing such sludge but is an expensive operation, results in excessive turbulence and involves the withdrawal of relatively large volumes of water. Some settling basins or clarifiers are equipped with drags, rakes, plows, scrapers, and the like, to move the sludge to withdrawal points, but such equipment is expensive to purchase and maintain. Other apparatus employed for such solids removal consists of intake or suction boxes which are moved along the bottom of the settling basin by mechanical means, but such devices are expensive to install, are adaptable only to basins of rectangular or circular shape, as viewed in plan, and require flat or relatively flat bottoms in the basins in which they are employed. Decantation of supernatent fluid and air drying of the sludge are not practical since they involve extended periods of time and atmospheric conditions conducive to evaporation.

Heretofore, it has been the usual practice to dispose of such gelatinous sludges accummulated in settling basins by flushing the same into surface streams or by discharging the gelatinous sludge to drying beds. Due to the pollution of surface streams, it is very desirable to remove these solids from settling basins by means other than flushing such solids to streams. While some water filtration plants have the large areas required for drying such gelatinous waste, many plants do not have such large areas.

SUMMARY OF THE INVENTION

In accordance with our invention, we provide means for producing laminar flow of gelatinous sludges and other sediments and agglomerations along the bottom of settling basins and ponds toward a withdrawal point.

Our invention includes the use of water or other fluid employed in the solids from liquid removal operations and obviates the necessity of draining the settling basin or the use of mechanical dredges or rakes. Also, our invention minimizes turbulence and resluts in a minimum dilution of the solids with liquids during withdrawal from the settling basin.

DESCRIPTION OF THE DRAWINGS

Apparatus embodying features of our invention and which may be employed to carry out our improved process is illustrated in the accompanying drawings, forming a part of this application, in which.

DETAILED DESCRIPTION

Figure 1:
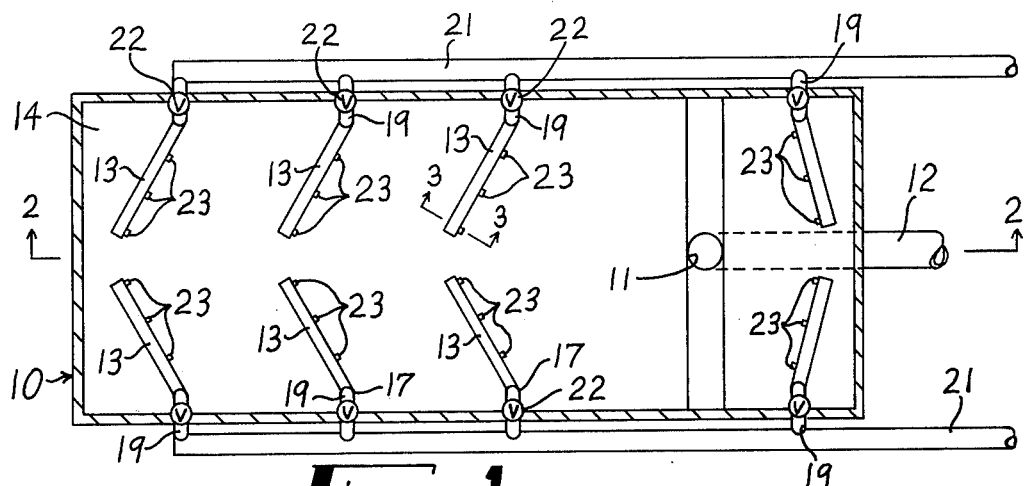
FIG. 1 is a top plan view showing the installation of our apparatus in a rectangular settling basin, such as is commonly employed in city water purification plants.
Figure 2:
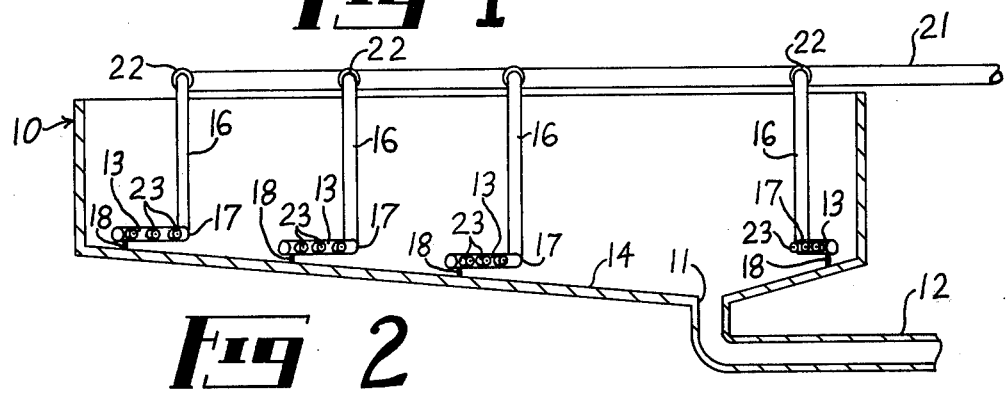
FIG. 2 is a vertical sectional view taken generally along the line 2—2 of FIG. 1.
Figure 3:
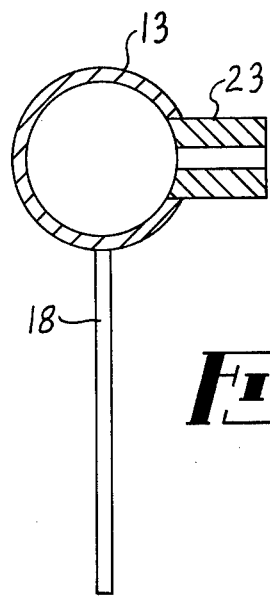
FIG. 3 is an enlarged, sectional view taken generally along the line 3—3 of FIG. 1, showing the liquid supply conduit as being in the form of a manifold having nozzle installations and support legs for positioning the manifold in spaced relation to the bottom of a settling basin.

Referring now to the drawings for a better understanding of our invention, we show in FIG. 1 a conventional type settling basin 10 which is adapted to receive raw water from a suitable source of supply. The raw water in settling basin 10 has been treated with a suitable coagulant, such as lime and alum to precipitate impurities, such as solid matter. Since large amounts of sludge accumulate in the settling basin 10, it is necessary to remove such sludge at intervals so as to maintain the overall efficiency of the system. In FIGS. 1 and 2, we show the gelatinous sludge and solid sedimentations as being removed through a discharge opening 11 which communicates with a discharge conduit 12. The gelatinous sludge and solid sedimentations are moved toward the discharge opening 11 by introducing a stream of liquid into contact with the sludge and the sediments at a rate to produce laminar flow of the sludge and the sedimentations toward the discharge opening 11. In FIGS. 1 and 2 we show the streams of liquid as being introduced by a plurality of supply conduits 13 which are mounted in the settling basin 10 whereby they extend along and superjacent the bottom 14 of the settling basin. As shown in FIGS. 1 and 2, each liquid supply conduit 13 communicates with an upstanding conduit 16 by a suitable pivot joint 17 whereby each supply conduit 13 may be moved to selected positions. Preferably, the supply conduits 13 extend inwardly and rearwardly as viewed in the direction of movement of the sludge toward the discharge opening 11, as shown. However, the pivot joint 17 permits each supply conduit 13 to be moved to various angular positions. As shown in FIGS. 2 and 3, each supply conduit 13 carries a depending support member 18 which is adapted to engage the bottom 14 of the basin 10 whereby each supply conduit 13 is supported in spaced relation to the bottom of the basin 10. Fluid is supplied to the vertical conduits 16 by branch conduits 19 which in turn communicate with supply conduits 21. As shown in FIG. 1, a control valve 22 is provided in each branch conduit 19 whereby the flow of liquid through each supply conduit 13 may be controlled. A plurality of liquid charged nozzles 23 are carried by each liquid supply conduit 13 and are directed toward the discharge opening 11. As shown in FIG. 3, each discharge nozzle 23 extends horizontally toward the discharge opening 11 whereby the stream of liquid emitted moves the gelatinous sludge and the solid sedimentations along the bottom of the settling basin 10 toward the discharge opening 11 without impingement of the stream of liquid on the bottom.

From the foregoing description, the operation of the apparatus shown in FIGS. 1 through 3 will be readily understood. The control valves 22 are actuated periodically or sequentially to continuously or intermittently move the gelatinous sludge and solid sedimentations along the bottom 14 of the settling basin 10 toward the discharge opening 11 whereby the sludge and sedimentations are then removed through the conduit 12. The materials may be removed through the conduit 12 by gravity or suitable pump means may be employed. The velocity or thrust of the stream of liquid discharged through each nozzle depends upon the nature of the sludge and solids being removed.

The clearance of each liquid supply 13 from the bottom 14 of the basin 10 may be varied by installing support members 18 of various lengths. The size of the basin 10 and the nature of the sludge being removed will also determine the number of supply conduits 13 which should be installed. Also, the width of the basin 10 will determine whether or not the fluid will be fed through the supply conduits 13 from one side or from both sides of the basin 10. Preferably, the supply conduits 13 are positioned, as shown in FIG. 1, to provide a generally chevron-shape whereby the supply conduits 13 extend inwardly and rearwardly relative to the direction of travel of the sludge toward the discharge opening 11.

Figure 4:
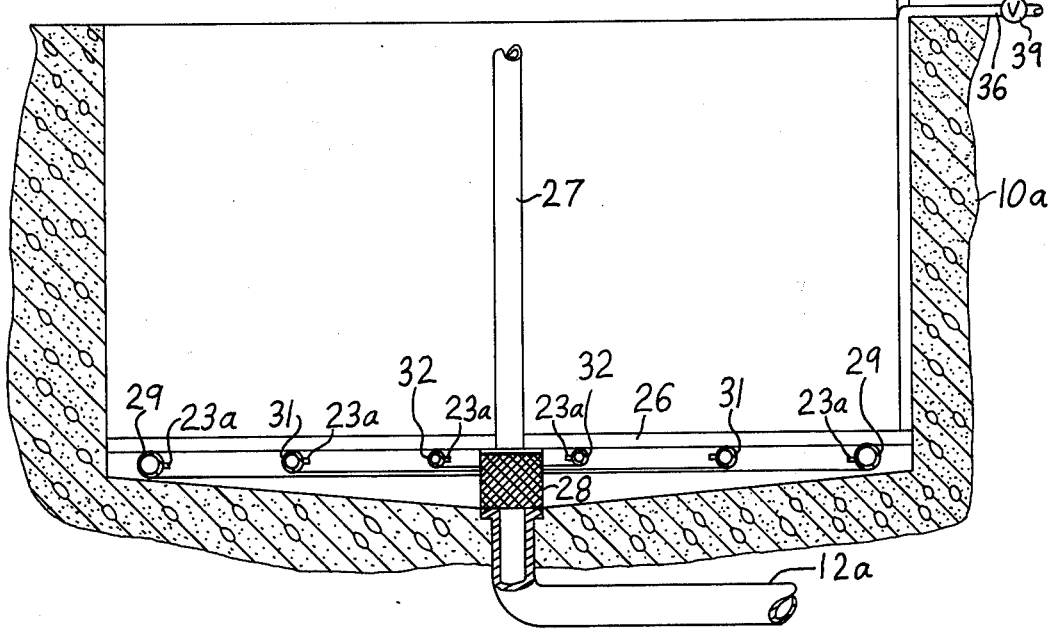
FIG. 4 is a vertical sectional view taken generally along the line 4—4 of FIG. 5 showing the installation of our apparatus in basins or receptacles of circular shape.
Figure 5:
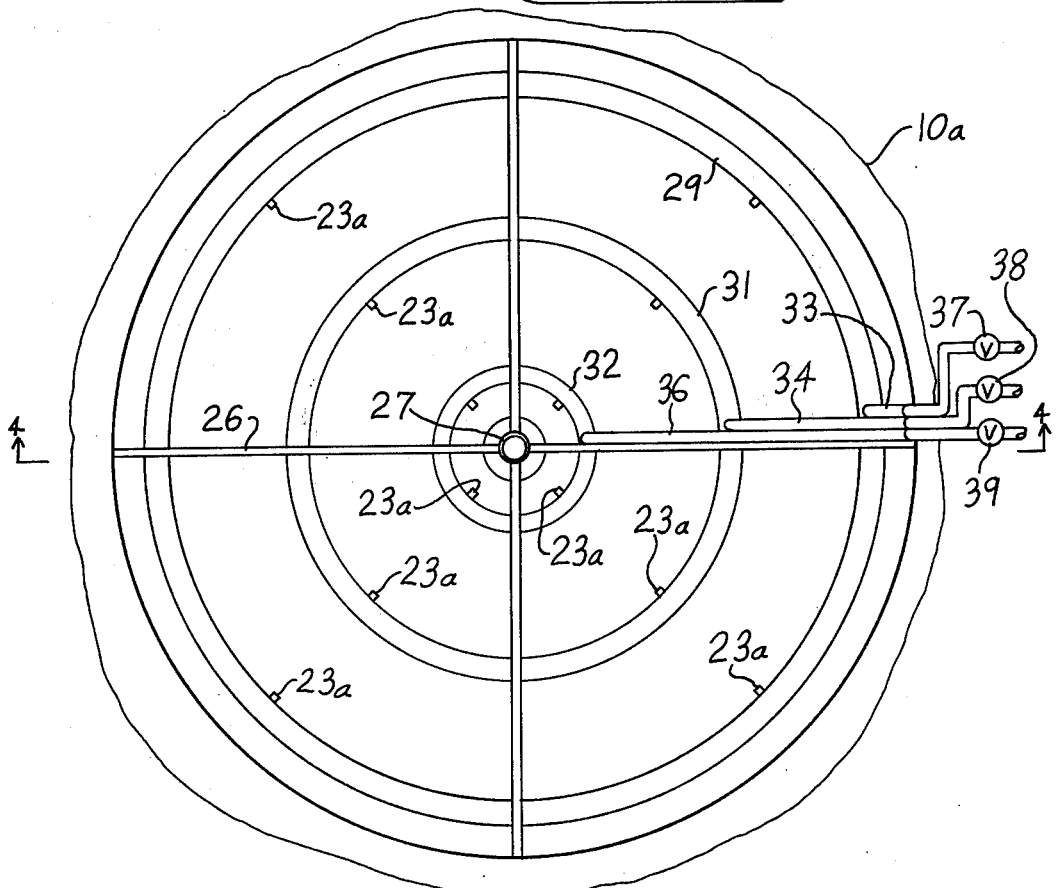
FIG. 5 is a top plan view taken generally along the line 5—5 of FIG 4.

In FIGS. 4 and 5, we show a circular settling basin 10$^a$ which carries radially extending support arms 26 that are attached to a sludge removal conduit 27 having a suitable screen 28 at the lower and thereof to prevent the passage of large particles, such as rocks or the like, into the conduit 27. The sludge removal conduit 27 is operatively connected to a suitable pump, not shown, whereby the sludge may be removed. Also, the settling basin 10a may be provided with a conventional fixed withdrawal conduit 12a adjacent the bottom center thereof, as shown. The screen 28 also prevents the passage of large particles into the conduit 12a. Mounted within the basin 10$^a$ and secured to the redially extending arms 26 are concentric liquid supply conduits 29, 31 and 32 which are connected to supply conduits 33, 34 and 36, respectively. Suitable control valves 37, 38 and 39 are provided in the conduits 33, 34 and 36, respectively, whereby the liquid may be introduced sequentially to continuously or intermittently move the sludge toward the sludge removal conduits 12a and 27. Sutable jet nozzles 23a, which are identical to the jet nozzles 23, are provided in each of the supply conduits 29, 31 and 32 where by the sludge is moved progressively toward the sludge removal conduits 12a and 27. As shown in FIG. 4, the nozzles 23$^a$ extend horizontally toward the receiving end of the sludge removal conduit 27 so that there is no impingement of the stream of liquid on the bottom of the basin 10a.

The operation of our improved apparatus shown in FIGS. 4 and 5 is similar to the operation of the apparatus shown in FIGS. 1–3. The fluid is introduced through the supply conduits 33, 34 and 36 into the annular supply conduits 29, 31 and 32 sequentially to continuously or intermittently move the sludge so as to produce laminar flow thereof toward the receiving end of the sludge removal conduit 27 without impingement of the stream of liquid on the bottom of basin 10a. The nature of the sludge being removed determines the size of the orifices in the jet nozzles 23 and 23a. That is, the orifices are of a size and are directed horizontally to produce laminar flow of the gelatinous sludge and the solid sedimentations along the bottom of the settling basin 10a until they reach the point of discharge.

Figure 7:
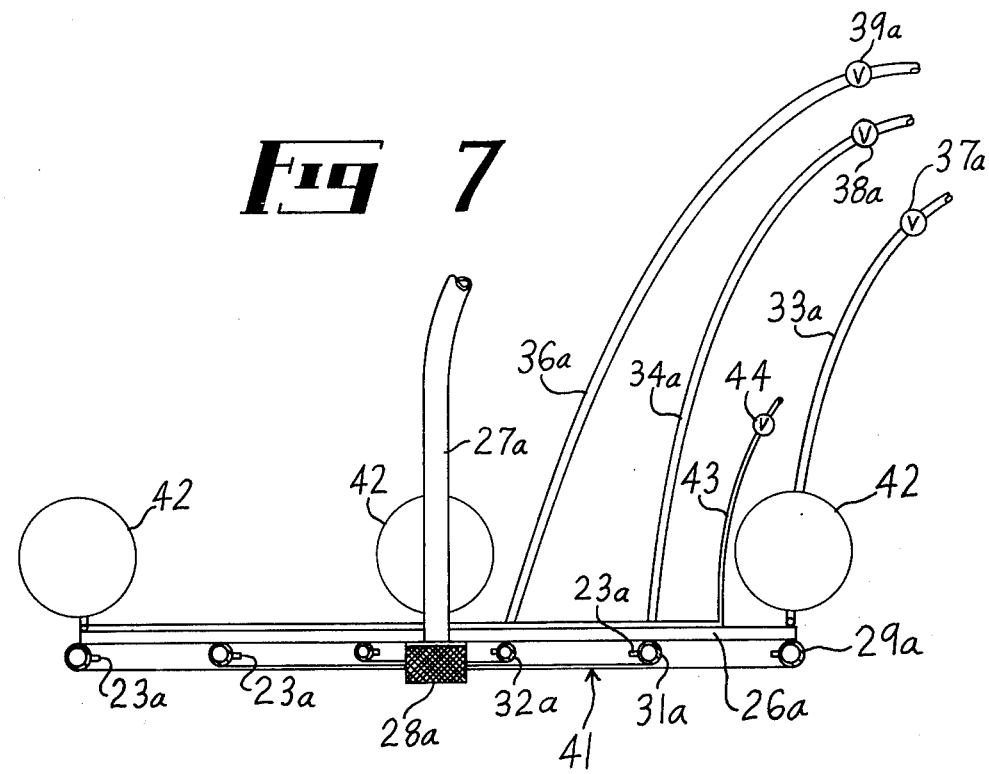
FIG. 7 is a vertical sectional view taken generally along the line 7—7 of FIG. 6.
Figure 6:
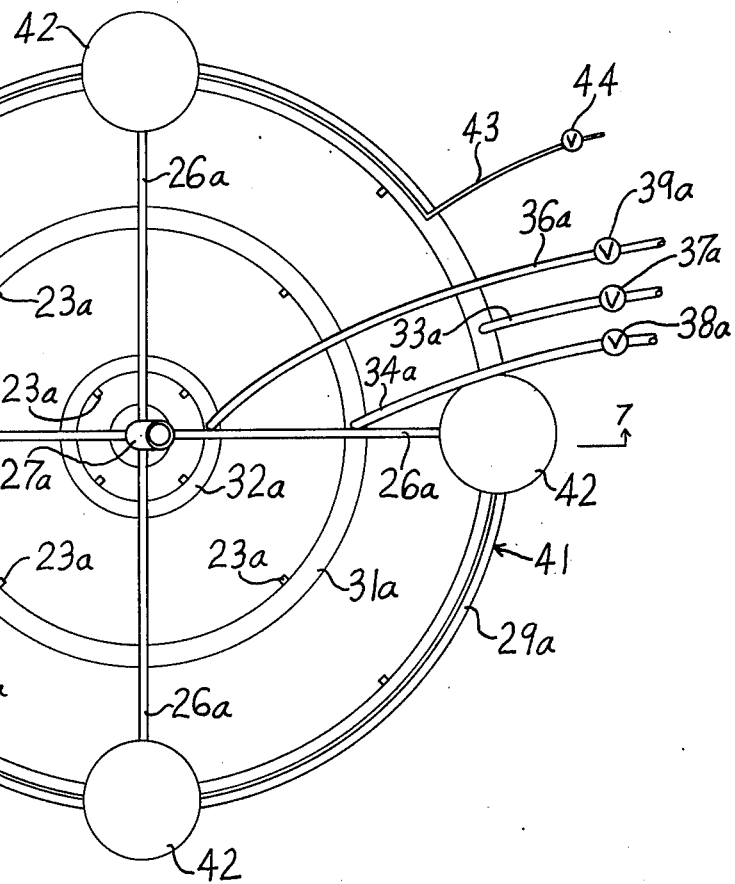
FIG. 6 is a top plan view showing a modified form of our invention which is particularly adapted for use as a mobile sludge removal unit.

In FIGS. 6 and 7, we show a movable frame 41 which carries radially extending support arms 26a which in turn carry concentric annular liquid supply conduits 29a, 31a and 32a that are supplied with propellant fluid through conduits 33a, 34a, 36a, respectively, or are connected to a manifold and supplied by a single conduit, if desired. Control valves 37a, 38a and 39a are provided in the conduits 33a, 34a and 36a, respectively, so that liquid may be introduced sequentially to continuously or intermittently move the sludge toward a point of discharge. The sludge may be withdrawn by a suction conduit 27a having a suitable screen 28a at the lower end thereof. Suitable jet nozzles 23a, which are identical to the jet nozzles 23, are also provided in each of the supply conduits 29a, 31a and 32a whereby the sludge is moved progressively toward the sludge removal conduit 27a. That is, the nozzles 23a are directed horizontally and toward the receiving end of the sludge removal conduit 27a.

To facilitate movement of the frame 41 to selected positions in a basin or pond, inflatable members 42 are attached to the frame 41. Air is introduced into the inflatable members 42 by a suitable supply line 43 having a control valve 44 therein. The number of annular supply conduits 29a, 31a and 32a is determined by the size of the basin and the relative fluidity of the sludge being removed. The low water velocities employed in addition to the radial pattern of the liquid discharged from the annular supply conduits 29a, 31a and 32a eliminates the necessity of anchoring the movable apparatus thus minimizing the cost of construction and operation. It will be apparent that the conduits 29a, 31a and 32a may assume other shapes, such as rectangular, oval or the like.

From the foregoing, it will be seen that we have devised an improved process and apparatus for transferring gelatinous sludge and solid sedimentations carried thereby along the bottom of a settling basin and then removing the same therefrom. By maintaining laminar flow of the sludge and the solids carried thereby as they move horizontally toward the discharge point, a minimum of liquid is required to convey the sludge and at the same time the liquid above the sludge is not disturbed.

While we have shown the basin 10 as being rectangular and the basin 10a as being round, it will be apparent that either of these basins could be of other shapes. It will also be apparent that the movable frame 41 could assume other shapes as will be apparent to one skilled in the art to which our invention relates.

While we have shown our invention in several forms, it will be obvious to those skilled in the art that it is not so limited, but is susceptible of various other changes and modifications without departing from the spirit thereof.

What we claim is:

1. Apparatus for transferring gelatinous sludge and solid sedimentations along the bottom of a settling basin and removing the same at a discharge point located centrally of said apparatus comprising:
   a. a plurality of concentric, spaced apart liquid supply conduits extending along and superjacent said bottom of said settling basin,
   b. a plurality of liquid discharge nozzles carried by said concentric supply conduits and directed substantially horizontal and radially toward said discharge point and positioned so that there is no impingement of streams of liquid from said nozzles on the bottom of the settling basin,
   c. fluid control means operatively connected to each supply conduit for introducing liquid into said supply conduits at a rate to produce laminar flow of said sludge and said sedimentations progressively toward said discharge point, and
   d. means to remove said sludge and sedimentations at said discharge point.

2. Apparatus as defined in claim 1 in which said liquid supply conduits are carried by a movable frame having inflatable floats whereby said movable frame is movable to selected locations in a settling basin.

3. Apparatus as defined in claim 2 in which sludge removal means is carried by said movable frame at said discharge point.

* * * * *